United States Patent
Ishizaki

(10) Patent No.: US 9,665,310 B2
(45) Date of Patent: May 30, 2017

(54) STORAGE CONTROL APPARATUS, STORAGE CONTROL SYSTEM, AND CONTROL METHOD

(71) Applicant: FUJITSU LIMITED, Kawasaki-shi, Kanagawa (JP)

(72) Inventor: Jun Ishizaki, Sagamihara (JP)

(73) Assignee: FUJITSU LIMITED

( * ) Notice: Subject to any disclaimer, the term of this patent is extended or adjusted under 35 U.S.C. 154(b) by 77 days.

(21) Appl. No.: 14/744,079

(22) Filed: Jun. 19, 2015

(65) Prior Publication Data
US 2016/0062687 A1   Mar. 3, 2016

(30) Foreign Application Priority Data

Sep. 3, 2014 (JP) .................................. 2014-178980

(51) Int. Cl.
*G06F 12/00* (2006.01)
*G06F 3/06* (2006.01)

(52) U.S. Cl.
CPC .......... *G06F 3/0665* (2013.01); *G06F 3/0605* (2013.01); *G06F 3/0689* (2013.01)

(58) Field of Classification Search
CPC .................................. G06F 12/00; G06F 3/06
USPC ............................... 711/100, 114, 154, 200
See application file for complete search history.

(56) References Cited

U.S. PATENT DOCUMENTS

| | | | |
|---|---|---|---|
| 5,546,557 A | 8/1996 | Allen et al. | |
| 6,260,120 B1* | 7/2001 | Blumenau | G06F 3/0622 |
| | | | 707/999.003 |
| 6,421,711 B1* | 7/2002 | Blumenau | G06F 3/0605 |
| | | | 709/213 |
| 2010/0174865 A1* | 7/2010 | Koester | G06F 21/80 |
| | | | 711/114 |
| 2011/0191563 A1* | 8/2011 | Acedo | G06F 3/0605 |
| | | | 711/166 |
| 2013/0024640 A1* | 1/2013 | Reed | G06F 12/023 |
| | | | 711/170 |

FOREIGN PATENT DOCUMENTS

| | | |
|---|---|---|
| JP | 07-84839 | 3/1995 |
| JP | 2009-211544 | 9/2009 |

* cited by examiner

*Primary Examiner* — Tuan Thai
(74) *Attorney, Agent, or Firm* — Fujitsu Patent Center

(57) ABSTRACT

A storage control apparatus includes: a processor configured to execute a program for controlling access to a logical volume allocatable to a higher-level apparatus; and a storage configured to store the program, wherein the processor performs operations to: sets a value of identification information indicating whether notification of allocation to the higher-level apparatus is available in accordance with an order of recognition of a plurality of logical volumes to be allocated to the higher-level apparatus by the higher-level apparatus; and notifies the higher-level apparatus of information concerning one or more logical volumes of the plurality of logical volumes corresponding to the identification information.

17 Claims, 13 Drawing Sheets

FIG. 2

| No. | HOST I/F ID | HOST TYPE |
|---|---|---|
| 1 | 0x0000000000000000 | HP-UX |
| 2 | iqn.1994-05.com.redhat:78417e9d8860 | Linux |
| : | | |

| No. | SERVER-SIDE LUN | ID OF LU IN STORAGE APPARATUS |
|---|---|---|
| 1 | 0x4000 | 0x0000 |
|   | 0x4001 | 0x0001 |
|   | 0x4002 | 0x0002 |
| 2 |  |  |
|   |  |  |
| : |  |  |

| No. | HOST I/F NO. | LUN MAPPING TABLE NO. | 103 |
|---|---|---|---|
| 1 | 1 | 1 | |
| 2 | | | |
| : | | | |

FIG. 5

| No. | SERVER-SIDE LUN | ID OF LU IN STORAGE APPARATUS | INITIAL STATE DETERMINATION FLAG |
|---|---|---|---|
| 1 | 0x4000 | 0x0000 | 0 |
|   | 0x4001 | 0x0001 | 1 |
|   | 0x4002 | 0x0002 | 1 |
| 2 |   |   |   |
| : |   |   |   |

FIG. 6A

| No. | HOST I/F ID | HOST TYPE |
|---|---|---|
| 1 | 0x0000000000000000 | HP-UX |
| 2 | iqn.1994-05.com.redhat:78417e9d8860 | Linux |

| No. | HOST I/F No. | LUN MAPPING TABLE NO. |
|---|---|---|
| 1 | 1 | 1 |

103 — ADDITION A1

REFERENCE A2

FIG. 6C

| No. | SERVER-SIDE LUN | ID OF LU IN STORAGE APPARATUS |
|---|---|---|
| 1 | 0x4000 | 0x0000 |
|   | 0x4001 | 0x0001 |
|   | 0x4002 | 0x0002 |

102

REFERENCE A3

FIG. 6D

| No. | SERVER-SIDE LUN | ID OF LU IN STORAGE APPARATUS | INITIAL STATE DETERMINATION FLAG |
|---|---|---|---|
| 1 | 0x4000 | 0x0000 | 0 |
|   | 0x4001 | 0x0001 | 1 |
|   | 0x4002 | 0x0002 | 1 |

104

COPY A4

FIG. 7A

| No. | HOST I/F ID | HOST TYPE |
|---|---|---|
| 1 | 0x0000000000000000 | HP-UX |
| 2 | iqn.1994-05.com.redhat:78417e9d8860 | Linux |

101

REFERENCE — B4

FIG. 7B

| No. | HOST I/F No. | LUN MAPPING TABLE NO. |
|---|---|---|
| 1 | 1 | 1 |

103

REFERENCE — B3

| No. | SERVER-SIDE LUN | ID OF LU IN STORAGE APPARATUS |
|---|---|---|
| 1 | 0x4000 | 0x0000 |
|  | 0x4001 | 0x0001 |
|  | 0x4002 | 0x0002 |
|  | 0x4003 | 0x0003 |
|  | 0x4004 | 0x0004 |

B1 ADDITION
B2 ADDITION

COPY — B5

| No. | SERVER-SIDE LUN | ID OF LU IN STORAGE APPARATUS | INITIAL STATE DETERMINATION FLAG |
|---|---|---|---|
| 1 | 0x4003 | 0x0003 | 0 |
|  | 0x4004 | 0x0004 | 1 |

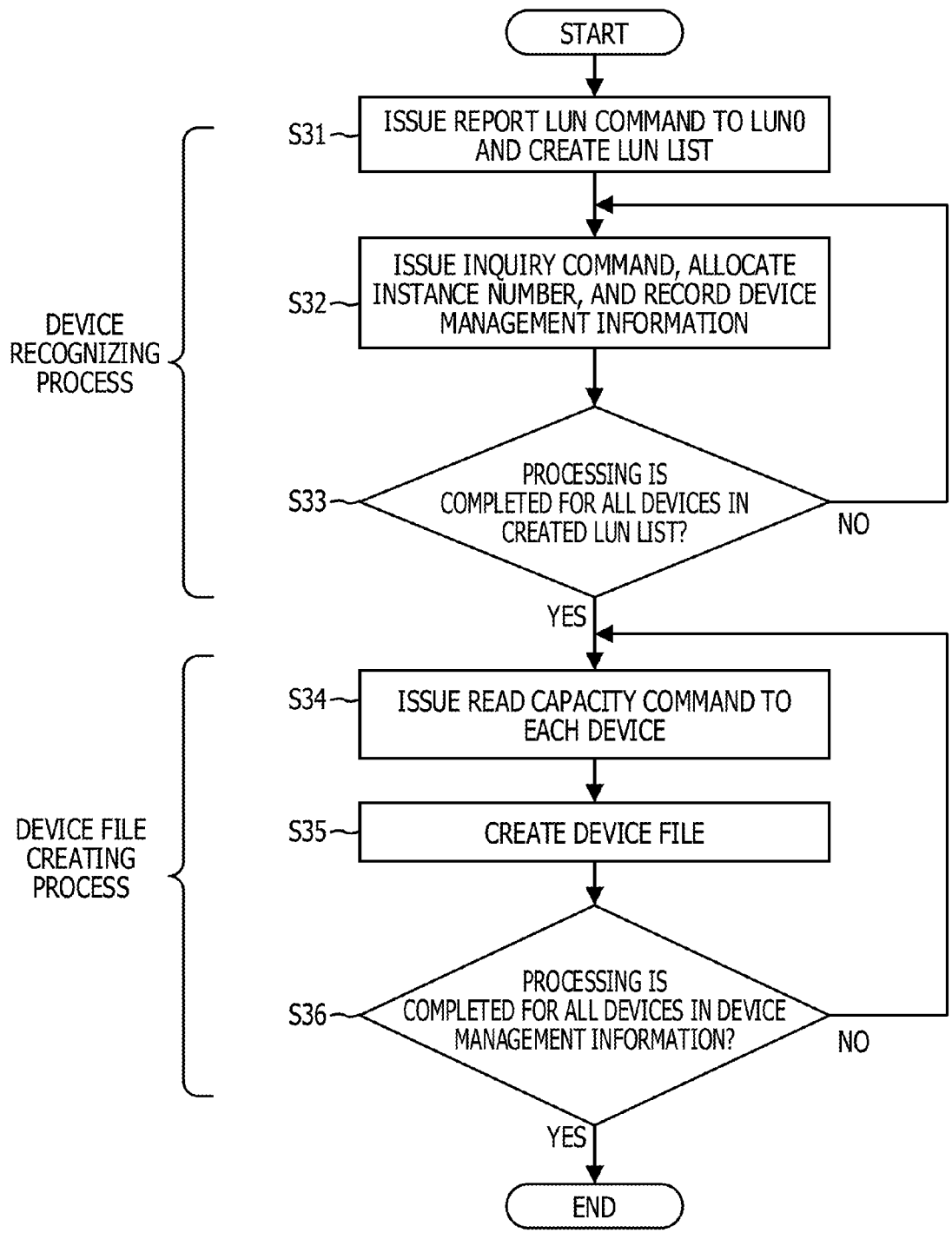

STORAGE CONTROL APPARATUS, STORAGE CONTROL SYSTEM, AND CONTROL METHOD

CROSS-REFERENCE TO RELATED APPLICATION

This application is based upon and claims the benefit of priority of the prior Japanese Patent Application No. 2014-178980, filed on Sep. 3, 2014, the entire contents of which are incorporated herein by reference.

FIELD

The embodiments discussed herein are related to a storage control apparatus, a storage control system, and a control method.

BACKGROUND

A storage apparatus is communicatably coupled to a server apparatus.

Related technologies are disclosed in, for example, Japanese Laid-open Patent Publication No. 2009-211544 and Japanese Laid-open Patent Publication No. 7-84839.

SUMMARY

According to an aspect of the embodiments, a storage control apparatus includes: a processor configured to execute a program for controlling access to a logical volume allocatable to a higher-level apparatus; and a storage configured to store the program, wherein the processor performs operations to: sets a value of identification information indicating whether notification of allocation to the higher-level apparatus is available in accordance with an order of recognition of a plurality of logical volumes to be allocated to the higher-level apparatus by the higher-level apparatus; and notifies the higher-level apparatus of information concerning one or more logical volumes of the plurality of logical volumes corresponding to the identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a host I/F table;

FIG. 3 illustrates an example of a LUN mapping table;

FIG. 4 illustrates an example of a LUN-HOST allocation table;

FIG. 5 illustrates an example of a new addition LUN table;

FIGS. 6A to 6D illustrate an example of a process of creating a new addition LUN table;

FIGS. 7A to 7D illustrate an example of a process of creating a new addition LUN table;

FIG. 13 illustrates an example of a process of recognizing a device and creating a device file.

DESCRIPTION OF EMBODIMENTS

Figure 1:
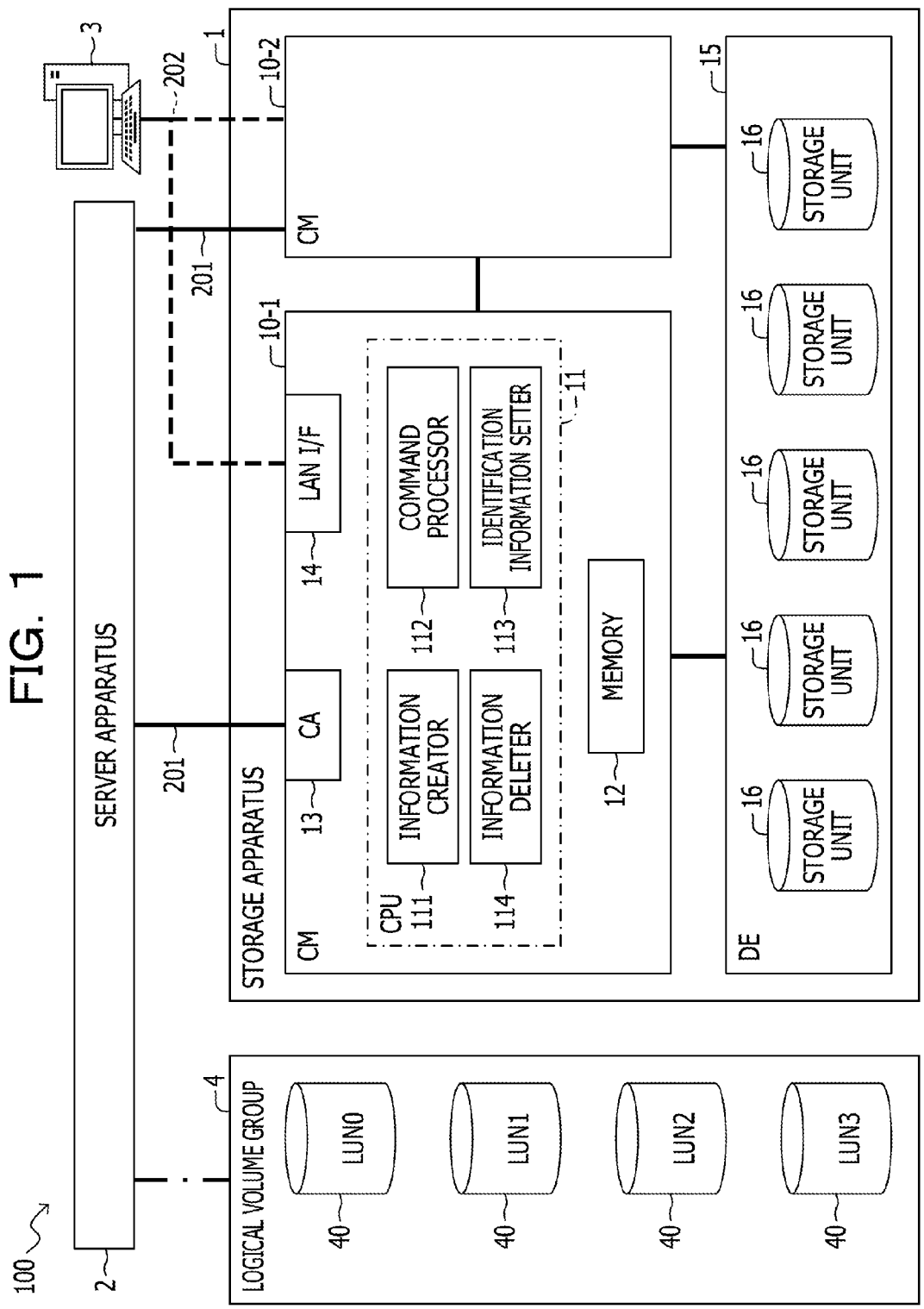
FIG. 1 illustrates an example of a functional configuration of a storage system.

Upon recognition of logical volumes which are defined on storage apparatuses, for example, devices, a higher-level apparatus which is communicatably coupled to the storage apparatuses, for example, a server apparatus allocates serial numbers which are unique in devices of the same type to the respective recognized devices. The server apparatus registers the instance number allocated to each device in device management information and creates a device file of each device based on the device management information.

The order of recognition of the devices by the higher-level apparatus, such as the server apparatus, may be determined only after an actual operation. For example, the order of recognition of the devices by the server apparatus may be varied depending on the operating condition of an operating system (OS) of the server apparatus or the operating conditions of the devices. When the order of recognition of the devices by the server apparatus is varied, the instance numbers of the devices are changed and the names of the device files (device file names) are also changed.

If the device file name of each device is different from the one supposed by an operator, settings of execution commands and software prepared by the operator in advance may not be used. Accordingly, the operator may manually perform re-recognition of the devices and re-creation of the device file names.

Drawings described below may include components in the drawings, other functions, and so on.

The same reference numerals are used in the drawings to identify similar components. A description of such similar components may be omitted herein. FIG. 1 illustrates an example of a functional configuration of a storage system. Referring to FIG. 1, a storage system 100 provides a storage area for a server apparatus 2. The storage system 100 includes a storage apparatus 1, the server apparatus 2, and a management terminal 3. The storage apparatus 1 may be a disk array apparatus. The storage apparatus 1 may be communicatably coupled to the server apparatus 2 via, for example, a storage area network (SAN) 201. The storage apparatus 1 may be communicatably coupled to the management terminal 3 via, for example, a local area network (LAN) 202.

The management terminal 3 may be an information processing apparatus including a central processing unit (CPU), a random access memory (RAM), and a read only memory (ROM) or a hard disk drive (HDD). The operator performs installation and maintenance of the storage apparatus 1 with the management terminal 3. The operator inputs information concerning, for example, a host interface (host I/F) table 101, a logical unit number (LUN) mapping table 102, and a LUN-HOST allocation table 103 illustrated in FIG. 2 to FIG. 4 with the management terminal 3.

Figure 11:
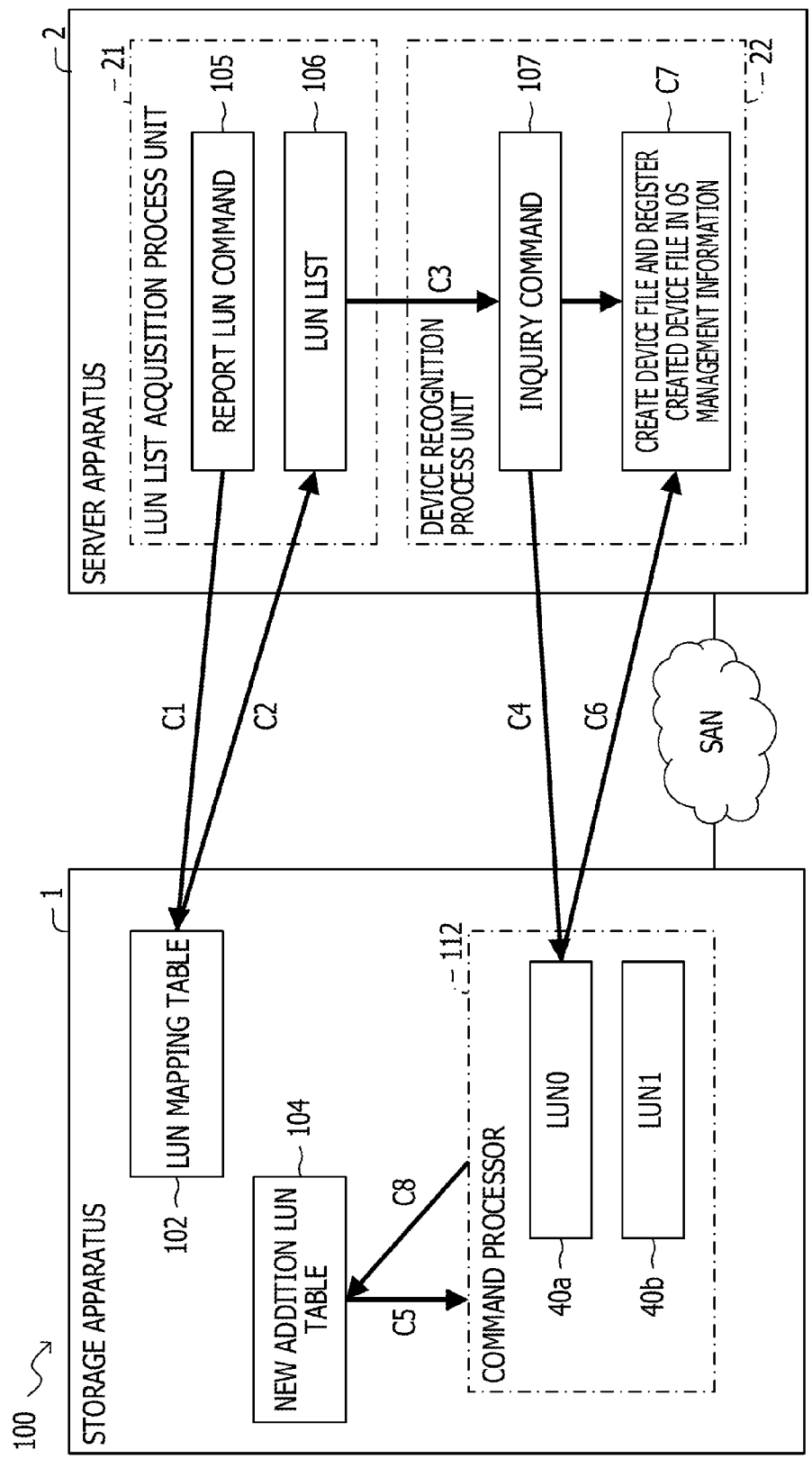
FIG. 11 illustrates an example of a process of responding to an Inquiry command.
Figure 12:
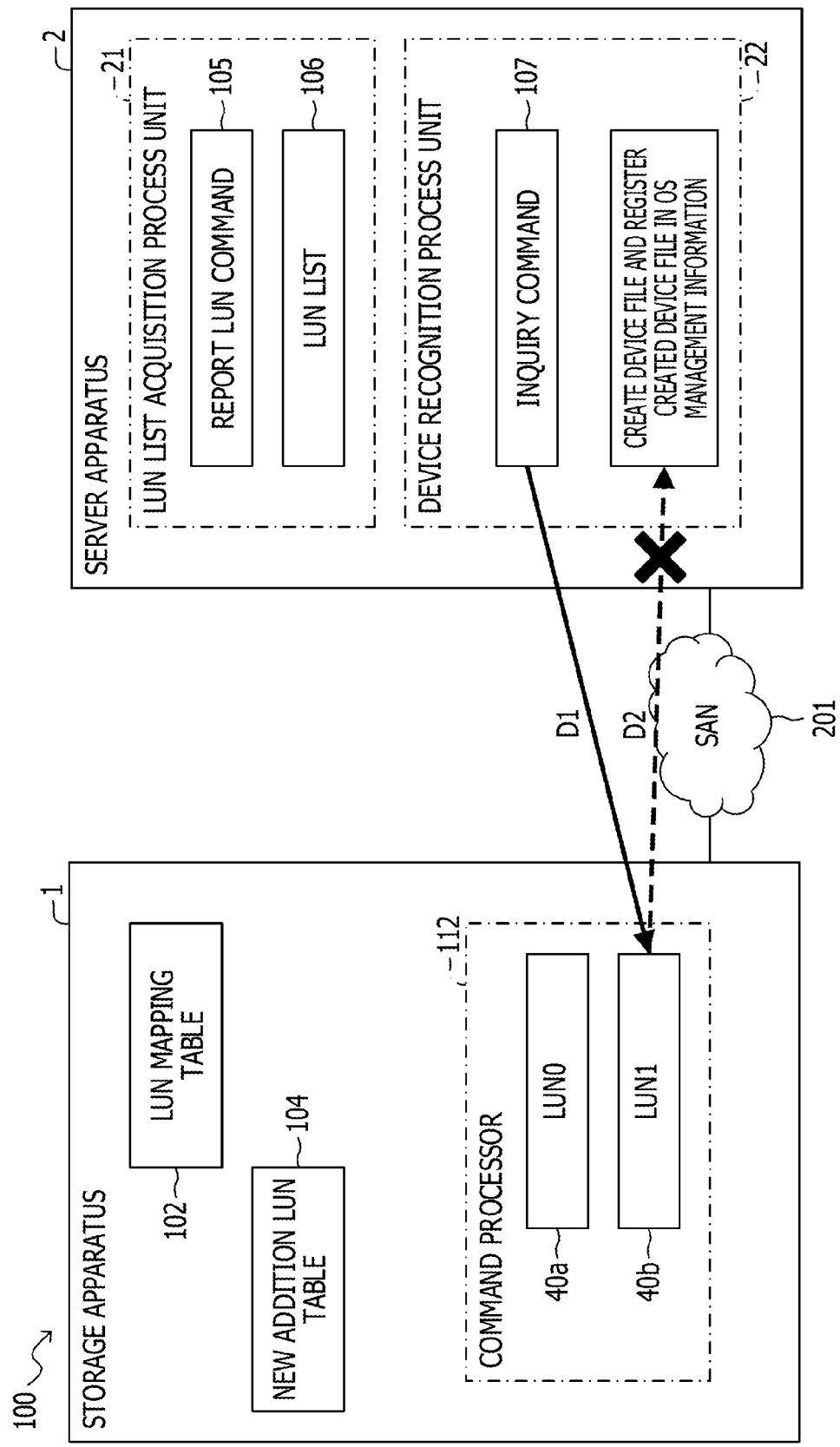
FIG. 12 illustrates an example of a process of responding to an Inquiry command.

The server apparatus 2 may be a computer (information processing apparatus) having a server function. Although one server apparatus 2 is provided in FIG. 1, two or more server apparatuses 2 may be provided. A CPU in the server apparatus 2 may function as a LUN list acquisition process unit 21 and a device recognition process unit 22, as illustrated in FIG. 11 and FIG. 12. The storage apparatus 1 includes multiple storage units 16 and provides the storage area for the server apparatus 2. The storage apparatus 1 distributes data into the multiple storage units 16 using, for example, redundant arrays of Inexpensive disks (RAID) and stores the data in a redundant state. The storage apparatus 1 includes one or multiple (two in FIG. 1) control modules (CMs; storage control apparatuses) 10-1 and 10-2 and a drive enclosure (DE) 15. The two CMs 10-1 and 10-2 are communicatably coupled to each other via, for example, a Peripheral Component Interconnect Express (PCIe) link. Each of the CMs 10-1 and 10-2 and the DE 15 are communicatably coupled to each other via a data path.

Hereinafter, as a reference indicating the CM, reference numeral 10-1 or 10-2 is used when one of the multiple CMs is to be desirably identified and reference numeral 10 is used when an arbitrary CM is to be specified. The DE 15 includes the multiple (five in FIG. 1) storage units 16. The storage units 16 store data such that the data is capable of being read from the storage units 16 and written to the storage units 16. The storage units 16 may be known devices, for example, HDDs or solid state drives (SSDs). The storage units 16 may have similar functional configuration with each other.

The server apparatus 2 recognizes the storage capacity of the storage units 16 as a logical volume group 4 when the server apparatus 2 uses the storage units 16. The logical volume group 4 includes multiple (four in FIG. 1) logical volumes 40 in FIG. 1. The four logical volumes 40 have logical volume numbers (LUNs) 0 to 3. The server apparatus 2, by submitting an Input-Output (I/O) request to the storage apparatus 1 with specifying any one of LUNs 0 to 3, reads data from the storage units 16 and writes data to the storage units 16.

The CM 10 includes a CPU 11, a memory 12, a communication adapter (CA) 13, and a LAN interface (I/F) 14. The CM 10-1 and the CM 10-2 may have similar functional configuration with each other and the functional configuration of the CM 10-2 may be omitted for simplicity. The CA 13 is an interface controller that communicatably couples the CM 10 to the server apparatus 2.

The memory 12 may be a storage device including a ROM and a RAM. Programs including Basic Input-Output System (BIOS) or the like are written in the ROM in the memory 12. The software programs on the memory 12 are appropriately read out by the CPU 11 to be executed. The RAM in the memory 12 may be used as a temporary recording memory or a working memory. The CPU 11 may be a processing unit that performs a variety of control and various operations. The CPU 11 executes an OS or programs stored in the memory 12 to perform various functions.

FIG. 13 illustrates an example of a process of recognizing a device and creating a device file. A device recognizing process (Operations S31 to S33) and a device file creating process (Operations S34 to S36) are performed in the server apparatus. The server apparatus recognizes the devices (logical volumes) defined on the storage apparatus and creates the device file of each device.

For example, in Operation S31, the server apparatus issues an Inquiry command and a Report LUN command to the device of LUN 0. The server apparatus acquires information about the device of LUN 0 and information about devices of LUNs other than LUN 0 where targets exist and creates a LUN list based on the acquired information about the multiple devices.

In Operation S32, the server apparatus issues the Inquiry command to the respective devices sequentially from the device registered in the beginning of the created LUN list and sequentially recognizes the respective devices. The server apparatus allocates the serial numbers (instance numbers) which are uniquely allocated to devices of the same type to the respective devices that are recognized and records the serial numbers in a storage unit in the server apparatus as the device management information held by the OS. The server apparatus allocates the instance numbers to the respective devices that are recognized sequentially from the smaller instance numbers that are not used.

In Operation S33, the server apparatus determines whether the processing is completed for all the devices registered in the LUN list created in Operation S31. If the server apparatus determines that the processing is not completed for all the devices (NO in Operation S33), the process goes back to Operation S32. If the server apparatus determines that the processing is completed for all the devices (YES in Operation S33), in Operation S34, the server apparatus issues a Read Capacity command to each device based on the device management information held by the OS.

In Operation S35, the server apparatus creates the device file used to access each device. In Operation S36, the server apparatus determines whether the processing is completed for all the devices registered in the device management information held by the OS. If the server apparatus determines that the processing is not completed for all the devices (NO in Operation S36), the process goes back to Operation S34.

If the server apparatus determines that the processing is completed for all the devices (YES in Operation S36), the process in FIG. 13 is terminated. In installation of the storage system, for example, settings of commands and software that are executed before starting the operation are prepared in advance in order to reduce an error during the operation. No occurrence of the error in the settings of the commands and software that are prepared may be confirmed by multiple operators. The content of the settings of the commands and software may include the device file names of the devices. The commands and software may be set on the assumption that the device files are created in the same order as the order of the devices registered in the LUN list (refer to Operation S31 in FIG. 13) which is created in response to issuance of the Report LUN command by the server apparatus.

If the device file name of each device is different from the one supposed by the operator, the settings of the execution commands and software prepared in advance may be wasted. Even when restart of the server apparatus has been performed, the same instance numbers as those before restarting the server apparatus are allocated to the devices registered in the device management information. Accordingly, the operator may review all portions including the device file names, in the settings of the execution commands and software, in order to determine whether the re-recognition process of the devices is to be performed.

For example, the CPU 11 in the storage apparatus 1 illustrated in FIG. 1 may function as an information creator 111, a command processor (notifier) 112, an identification information setter 113, and an information deleter 114. Programs to perform the functions of the information creator 111, the command processor 112, the identification information setter 113, and the information deleter 114 may be provided in a mode in which the programs are recorded on a computer-readable recording medium, such as a flexible disk; a compact disc (CD) (for example, a compact disk-read only memory (CD-ROM), a compact disk-recordable (CD-R), or a compact disk-rewritable (CD-RW); a digital versatile disk (DVD) (for example, a DVD-ROM, a DVD-RAM, a DVD-R, a DVD+R, a DVD-RW, a DVD+RW, or a high definition DVD (HD DVD)); a Blu-ray disc; a magnetic disk; an optical disk; or a magneto-optical disk. The computer reads out the programs from the recording medium via a reading unit, transfers the programs to an internal recording unit or an external recording unit, and stores the programs for use. The programs may be recorded on the storage unit (recording medium), such as the magnetic disk, the optical disk, or the magneto-optical disk, and may be provided from the storage unit to the computer over a communication path.

When the functions of the information creator 111, the command processor 112, the identification information setter 113, and the information deleter 114 are performed, the programs stored in an internal storage unit, for example, the memory 12 are executed by a microprocessor, for example, the CPU 11 in the computer. The computer may read out the programs recorded on the recording medium to execute the programs.

Figure 4:
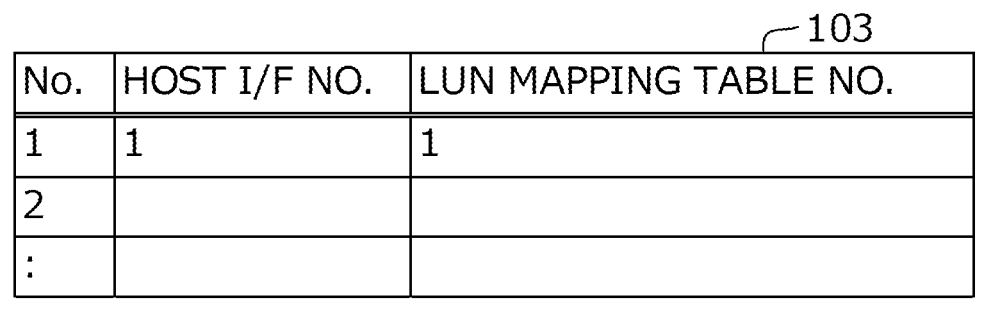

FIG. 2 illustrates an example of a host I/F table. FIG. 3 illustrates an example of a LUN mapping table. FIG. 4 illustrates an example of a LUN-HOST allocation table. The information creator 111 creates the host I/F table 101, the LUN mapping table 102, and the LUN-HOST allocation table 103 illustrated in FIG. 2 to FIG. 4, respectively, based on inputs from the operator. The information creator 111 stores the host I/F table 101, the LUN mapping table 102, and the LUN-HOST allocation table 103 which are created in, for example, the memory 12. The operator inputs information concerning the host I/F table 101, the LUN mapping table 102, and the LUN-HOST allocation table 103 using an input unit in the management terminal 3. The input information is transmitted to the CM 10 in the storage apparatus 1 via the LAN 202.

In the host I/F table 101 illustrated in FIG. 2, a host I/F identifier (ID) indicating an identification number of each interface (I/F) provided in the server apparatus 2 is associated with a host type indicating the type of each OS running on the server apparatus 2. In "No. 1" data in the host I/F table 101, "0x0000000000000000" is registered as the host I/F ID and "HP-UX" is registered as the host type. In "No. 2" data in the host I/F table 101, "iqn.1994-05.com.redhat: 78417e9d8860" is registered as the host I/F ID and "Linux (registered trademark)" is registered as the host type.

In the LUN mapping table 102 illustrated in FIG. 3, a server-side LUN (logical volume information) indicating the LUN of each logical volume 40 recognized by the server apparatus 2 is associated with an ID of each logical unit (LU) in the storage apparatus indicating the identification number of each logical volume 40 managed by the storage apparatus 1. In "No. 1" data in the LUN mapping table 102, server-side LUNs "0x4000", "0x4001", and "0x4002" are associated with IDs "0x0000", "0x0001", and "0x0002", respectively, of the LUs in the storage apparatus.

In the LUN-HOST allocation table 103 illustrated in FIG. 4, each host I/F number (No.) is associated with a LUN mapping table number (No.). The value indicating data number registered in the host I/F table 101 illustrated in FIG. 2 is registered in the host I/F number, and the value indicating data number registered in the LUN mapping table 102 illustrated in FIG. 3 is registered in the LUN mapping table number. In "No. 1" data in the LUN-HOST allocation table 103, "1" is registered as the host I/F number and "1" is registered as the LUN mapping table number. For example, the "No. 1" data in the LUN-HOST allocation table 103 indicates that the server-side LUNs "0x4000", "0x4001", and "0x4002" are allocated to the host I/F ID "0x0000000000000000". The creation of the LUN-HOST allocation table 103 by the information creator 111 based on inputs from the operator may cause the server apparatus 2 to access the logical volume 40 registered in the corresponding data number in the LUN mapping table 102 illustrated in FIG. 3.

FIG. 5 illustrates an example of a new addition LUN table. A new addition LUN table (additional logical volume information) 104 is created by extracting information about the logical volume 40 to be newly allocated to the server apparatus 2 from the LUN mapping table 102. An initial state determination flag (identification information) is set for each logical volume 40 in the new addition LUN table 104.

At first start-up of the server apparatus 2 or upon occurrence of change in configuration of the logical volumes 40, the information creator 111 creates the new addition LUN table 104. For example, when the association between the host I/F having the host type of "HP-UX" and the LUN mapping table 102 is registered in the LUN-HOST allocation table 103 illustrated in FIG. 4, the information creator 111 creates the new addition LUN table 104. For example, when a LUN is added to the LUN mapping table 102 associated with the host I/F which has been registered in the LUN-HOST allocation table 103 and has the host type of "HP-UX", the information creator 111 creates the new addition LUN table 104. The information creator 111 stores the created new addition LUN table 104 in, for example, the memory 12.

At restart of the server apparatus 2 having the host type of "HP-UX", the same instance numbers as those before restarting the server apparatus 2 are allocated to the devices registered in the device management information. Since the server apparatus 2 accesses the logical volume 40 using the same device file as that before the restart also after the restart, the order of recognition of the logical volumes 40 by the server apparatus 2 may not be ensured even when the server apparatus 2 has been restarted. When the host type of the server apparatus 2 is "HP-UX", the information creator 111 creates the new addition LUN table 104.

In the new addition LUN table 104 illustrated in FIG. 5, in addition to information included in the LUN mapping table 102 illustrated in FIG. 3, the initial state determination flag indicating whether notification of the allocation of the logical volume 40 to the server apparatus 2 is available is associated. The information creator 111 creates the new addition LUN table 104 by reading out the information registered in the LUN mapping table 102 and adding the initial state determination flag to the information that is read out. For example, the information creator 111 creates the new addition LUN table 104 in which the server-side LUN specifying the logical volume 40 to be allocated to the server apparatus 2 is associated with the identification information indicating whether the notification of the allocation of the logical volume 40 to the server apparatus 2 is available.

In "No. 1" data in the new addition LUN table 104, the server-side LUNs and the IDs of the LUs in the storage apparatus corresponding to the "No. 1" data in the LUN mapping table 102 illustrated in FIG. 3 are registered. For example, the information creator 111 registers the same value as the number of the LUN mapping table 102 corresponding to the section of the number in the new addition LUN table 104.

In the creation of the new addition LUN table 104, the identification information setter 113 sets, to "0", the initial state determination flag of the leading data among the data to which the same number is allocated in the new addition LUN table 104, for example, the data having the smallest value of the server-side LUN. In the creation of the new addition LUN table 104, the identification information setter 113 sets, to "1", the initial state determination flags of the data other than the leading data, among the data to which the same number is allocated in the new addition LUN table 104, for example, the data having the smallest value of the server-side LUN. For example, the identification information setter 113 sets a value indicating that the notification of the allocation is available, for example, "0" to the initial state determination flag corresponding to the server-side LUN to be registered to the beginning of the new addition LUN table 104. The identification information setter 113 sets a value indicating that the notification of the allocation is in a standby mode, for example, "1" to the initial state determination flags corresponding to the server-side LUNs other than the server-side LUN to be registered to the beginning of the new addition LUN table 104.

Referring to FIG. 5, the initial state determination flag of "0x4000", which is the leading data among the three pieces of data to which "No. 1" is allocated in the new addition LUN table 104, and which has the smallest value of the server-side LUN, is set to "0". The initial state determination flags of "0x4001" and "0x4002", which are not the leading data among the three pieces of data to which "No. 1" is allocated in the new addition LUN table 104, and which do not have the smallest value of the server-side LUN, are set to "1".

Upon completion of the notification of the server-side LUN by the command processor 112, the identification information setter 113 updates the initial state determination flag in the new addition LUN table 104. For example, the identification information setter 113 updates the initial state determination flag corresponding to the server-side LUN registered next to the server-side LUN for which the notification is completed in the new addition LUN table 104 to "0", which is the value indicating that the notification of the allocation is available.

Upon reception of the Inquiry command from the server apparatus 2, the command processor 112 returns a response corresponding to the setting of the initial state determination flag in the new addition LUN table 104 to the server apparatus 2. Upon reception of the Inquiry command about the logical volume 40 from the server apparatus 2, the command processor 112 notifies the server apparatus 2 of the server-side LUN of the data the initial state determination flag of which is set to "0" in the new addition LUN table 104. For example, the command processor 112 notifies the server apparatus 2 of the server-side LUN corresponding to the initial state determination flag to which the value indicating that the notification is available is set in the new addition LUN table 104 created by the information creator 111. If the logical volume 40 corresponding to the Inquiry command from the server apparatus 2 is not registered in the new addition LUN table 104, the command processor 112 transmits information about the logical volume 40 to the server apparatus 2.

Upon reception of the Inquiry command about the logical volume 40 from the server apparatus 2, the command processor 112 does not notify the server apparatus 2 of the server-side LUN of the data the initial state determination flag of which is set to "1" in the new addition LUN table 104. For example, the command processor 112 puts the process of recognizing the logical volume 40 in the server apparatus 2 in the standby mode so that the logical volume 40 is recognized in the server apparatus 2 and the device file is created in a manner supposed by the operator.

Upon completion of the notification of all the server-side LUNs included in the new addition LUN table 104 by the command processor 112, the information deleter 114 deletes the pieces of data for which the notification is completed from the new addition LUN table 104. Referring to FIG. 5, upon completion of the notification of the server-side LUNs "0x4000", "0x4001", and "0x4002" to the server apparatus 2 by the command processor 112, the information deleter 114 deletes the three pieces of "No. 1" data in the new addition LUN table 104. Upon completion of the notification of one server-side LUN to the server apparatus 2 by the command processor 112, the information deleter 114 may delete one piece of data corresponding to the server-side LUN for which the notification is completed. For example, the new addition LUN table 104 may be a working table that is temporarily created in the notification of the allocation of the logical volume 40 to the server apparatus 2.

When the data in the LUN mapping table 102 or the LUN-HOST allocation table 103 is deleted, the deletion of the logical volume 40 in the storage apparatus 1 may not release the instance number allocated to the logical volume 40 to be deleted in the OS of the server apparatus 2. Also when the server apparatus 2 recognizes a new logical volume 40, the instance number allocated to the server apparatus 2 and the device file corresponding to the instance number may not be released. When the logical volume 40 in the LUN mapping table 102 or the LUN-HOST allocation table 103 is deleted and the new addition LUN table 104 including the logical volume 40 to be deleted exists, the information deleter 114 deletes the logical volume 40 to be deleted from the new addition LUN table 104. Accordingly, when the instance number of the logical volume 40 to be deleted has been released in the server apparatus 2, the device file corresponding to the released instance number may be used again when the server apparatus 2 recognizes a new logical volume 40.

FIGS. 6A to 6D illustrate an example of a process of creating a new addition LUN table. How to create the new addition LUN table 104 when the server apparatus 2 is caused to newly recognize the logical volumes 40 is illustrated in FIGS. 6A to 6D. FIG. 6A illustrates the host I/F table 101, FIG. 6B illustrates the LUN-HOST allocation table 103, FIG. 6C illustrates the LUN mapping table 102, and FIG. 6D illustrates the new addition LUN table 104.

The operator inputs the association between the host I/F number and the LUN mapping table number with the management terminal 3. The information creator 111 adds data in which the "No. 1" in the LUN-HOST allocation table 103 is associated with the host I/F number "1" and the LUN mapping table number "No. 1" (refer to symbol A1). The information creator 111 refers to the host type of the "No. 1" data in the host I/F table 101 based on the value "1" registered in the host I/F number in the LUN-HOST allocation table 103 (refer to symbol A2) and confirms that the host type is "HP-UX".

The information creator 111 refers to the "No. 1" data in the LUN mapping table 102 based on the value "1" registered in the LUN mapping table number in the LUN-HOST allocation table 103 (refer to symbol A3). The information creator 111 copies the "No. 1" data in the LUN mapping table 102 (refer to symbol A4) and registers the copied data in the new addition LUN table 104 as the "No. 1" data.

The identification information setter 113 sets, to "0", the initial state determination flag of the leading data among the data to which "No. 1" is allocated in the new addition LUN table 104, for example, the data having the smallest value of the server-side LUN. The identification information setter 113 sets, to "1", the initial state determination flags of the data other than the leading data among the data to which "No. 1" is allocated in the new addition LUN table 104, for example, the data having the smallest value of the server-side LUN.

The above processing creates the new addition LUN table 104 for causing the server apparatus 2 to newly recognize the logical volumes 40. FIGS. 7A to 7D illustrate an example of a process of creating a new addition LUN table. How to create the new addition LUN table 104 when the server apparatus 2 that has recognized the logical volumes 40 is caused to additionally recognize the logical volumes 40 is illustrated in FIGS. 7A to 7D. FIG. 7A illustrates the host I/F table 101, FIG. 7B illustrates the LUN-HOST allocation table 103, FIG. 7C illustrates the LUN mapping table 102, and FIG. 7D illustrates the new addition LUN table 104.

The operator inputs the association between the server-side LUN "0x4003" and the ID "0x0003" of the LU in the storage apparatus and the association between the server-side LUN "0x4004" and the ID "0x0004" of the LU in the storage apparatus with the management terminal 3. The information creator 111 adds the server-side LUN "0x4003 associated with the ID "0x0003" of the LU in the storage apparatus and the server-side LUN "0x4004" associated with the ID "0x0004" of the LU in the storage apparatus to the "No. 1" data in the LUN mapping table 102 (refer to symbol B1 and symbol B2).

The information creator 111 refers to the "No. 1" data having "1" registered as the LUN mapping table number in the LUN-HOST allocation table 103 based on the "No. 1" data in the LUN mapping table 102 (refer to symbol B3). The information creator 111 refers to the host type of the "No. 1" data in the host I/F table 101 based on the value "1" registered in the host I/F number of the "No. 1" data in the LUN-HOST allocation table 103 (refer to symbol B4). The information creator 111 confirms that the host type is "HP-UX".

The information creator 111 copies the pieces of data that are newly added, among the "No. 1" pieces of data in the LUN mapping table 102, (refer to symbol B5) and registers the copied pieces of data in the new addition LUN table 104 as the "No. 1" data. The identification information setter 113 sets, to "0", the initial state determination flag of the leading data among the data to which "No. 1" is allocated in the new addition LUN table 104, for example, the data having the smallest value of the server-side LUN. The identification information setter 113 sets, to "1", the initial state determination flag of the data other than the leading data among the data to which "No. 1" is allocated in the new addition LUN table 104, for example, the data having the smallest value of the server-side LUN.

Figure 8:
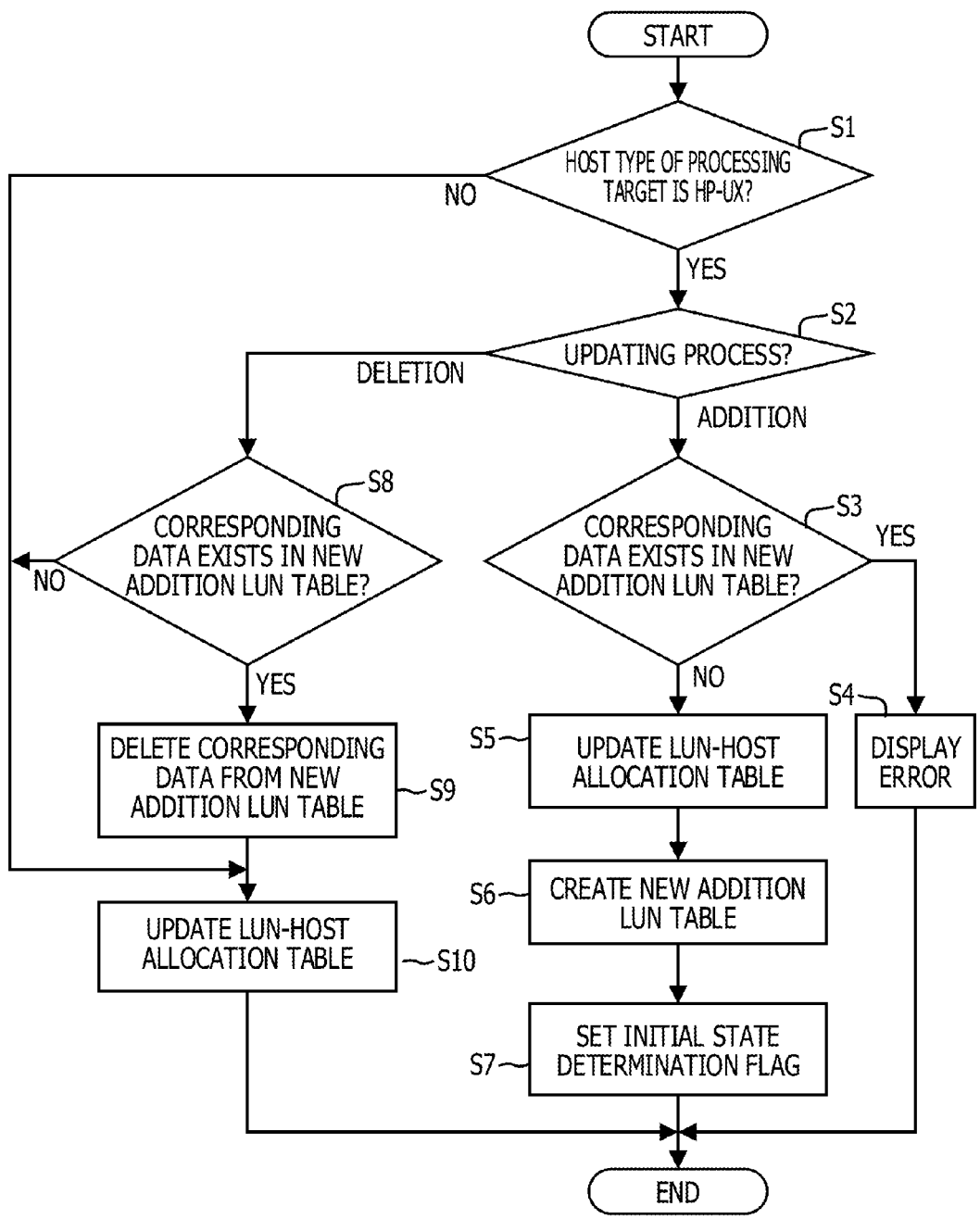
FIG. 8 illustrates an example of a process of creating a new addition LUN table.

The above processing creates the new addition LUN table 104 for causing the server apparatus 2 that has recognized the logical volumes 40 to additionally recognize the logical volumes 40. FIG. 8 illustrates an example of a process of creating a new addition LUN table. For example, FIG. 8 illustrates the process of creating the new addition LUN table 104 when the server apparatus 2 is caused to newly recognize the logical volume 40.

Operations S1 to S10 in FIG. 8 may be performed for each number of the LUN mapping table 102 illustrated in FIG. 3. The operator inputs information concerning a process of updating the LUN-HOST allocation table 103 with the management terminal 3. In Operation S1, the information creator 111 determines whether the host type of the I/F of the server apparatus 2 to be processed is HP-UX with reference to the host I/F table 101.

If the information creator 111 determines that the host type of the I/F of the server apparatus 2 to be processed is not HP-UX (NO in Operation S1), the process goes to Operation S10. If the information creator 111 determines that the host type of the I/F of the server apparatus 2 to be processed is HP-UX (YES in Operation S1), in Operation S2, the information creator 111 determines whether the updating process is a process of adding the logical volume 40 or a process of deleting the logical volume 40.

If the updating process is the process of adding the logical volume 40 (ADDITION in Operation S2), in Operation S3, the information creator 111 determines whether data corresponding to the LUN mapping table 102 to be processed exists in the new addition LUN table 104. For example, the information creator 111 determines whether the new addition LUN table 104 including the number coinciding with the LUN mapping table number of the data to be added exists.

If the information creator 111 determines that the corresponding data exists in the new addition LUN table 104 (YES in Operation S3), the information creator 111 may not create the new addition LUN table 104. For example, in Operation S4, the information creator 111 may display an error screen indicating that the logical volume 40 for which the notification of the allocation to the server apparatus 2 is not completed exists on a display of the management terminal 3. Then, the process in FIG. 8 may be terminated.

If the information creator 111 determines that the corresponding data does not exist in the new addition LUN table 104 (NO in Operation S3), in Operation S5, the information creator 111 updates the LUN-HOST allocation table 103 based on an input by the operator. For example, the information creator 111 updates the LUN-HOST allocation table 103 to associate the I/F of the server apparatus 2 with the LUN mapping table 102.

In Operation S6, the information creator 111 creates the new addition LUN table 104 in which the initial state determination flags are added to all the server-side LUNs included in the LUN mapping table 102 added to the LUN-HOST allocation table 103. In Operation S7, the identification information setter 113 sets the initial state determination flag of the data having the smallest value of the server-side LUN in the new addition LUN table 104 to "0" and sets the initial state determination flags of the data that do not have the smallest value of the server-side LUN to "1". Then, the process in FIG. 8 is terminated.

If the updating process is the process of deleting the logical volume 40 (DELETION in Operation S2), in Operation S8, the information deleter 114 determines whether data corresponding to the LUN mapping table 102 to be processed exists in the new addition LUN table 104. For example, the information deleter 114 determines whether the new addition LUN table 104 including the number coinciding with the LUN mapping table number of the data to be deleted exists.

If the information deleter 114 determines that the corresponding data does not exist in the new addition LUN table 104 (NO in Operation S8), the process goes to Operation S10. If the information deleter 114 determines that the corresponding data exists in the new addition LUN table 104 (YES in Operation S8), in Operation S9, the information deleter 114 deletes the data corresponding to the LUN mapping table 102 to be processed from the new addition LUN table 104.

Figure 9:
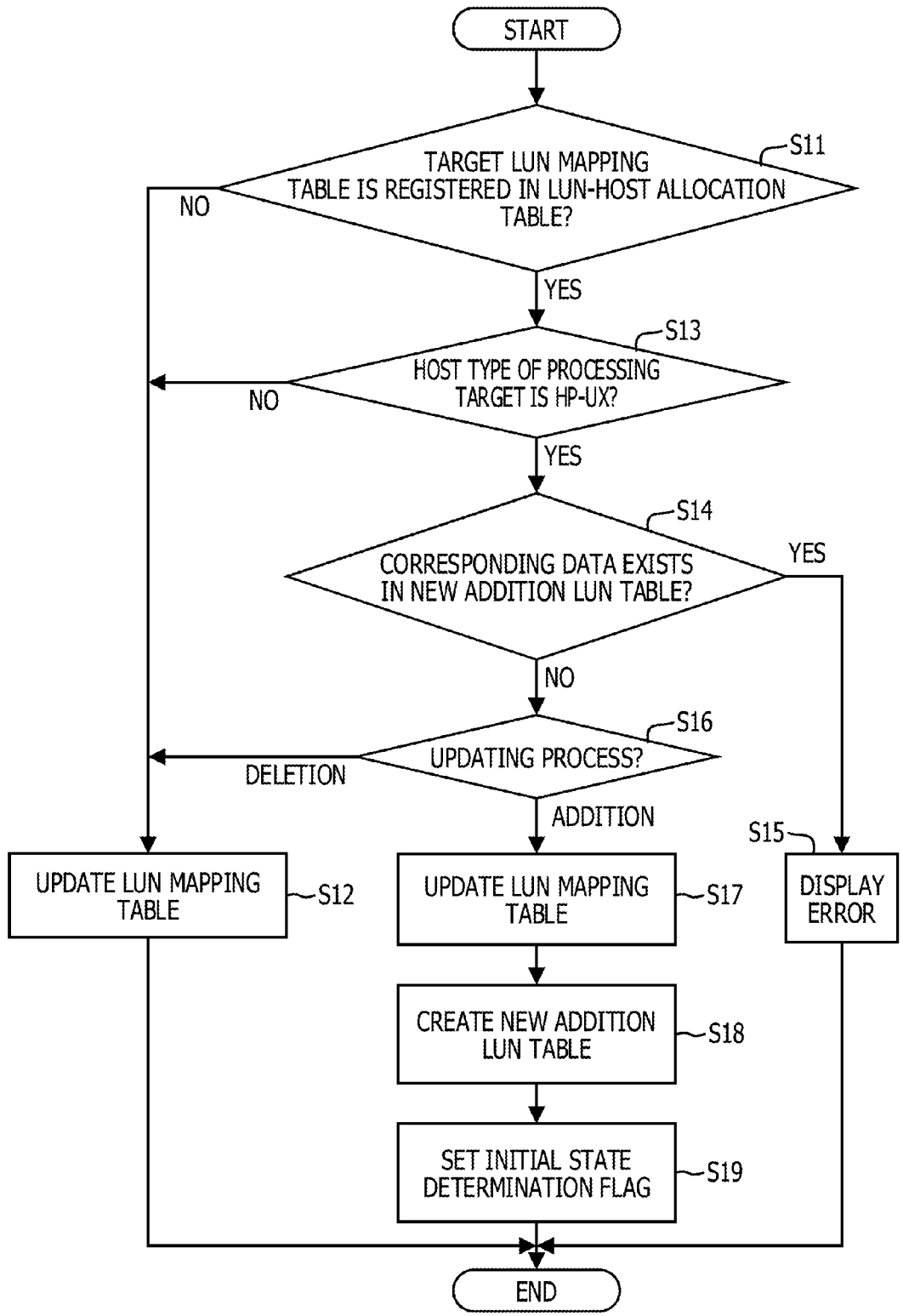
FIG. 9 illustrates an example of a process of creating a new addition LUN table.

In Operation S10, the information creator 111 updates the LUN-HOST allocation table 103 based on an input by the operator. Then, the process in FIG. 8 is terminated. FIG. 9 illustrates an example of a process of creating a new addition LUN table. For example, FIG. 9 illustrates the process of creating the new addition LUN table 104 when the server apparatus 2 that has recognized the logical volumes 40 is caused to additionally recognize the logical volume 40.

Operations S11 to S19 in FIG. 9 may be performed for each number of the LUN mapping table 102 illustrated in FIG. 3. Upon input of information concerning a process of updating the LUN mapping table 102 by the operator with the management terminal 3, in Operation S11, the information creator 111 determines whether the target LUN mapping table 102 is registered in the LUN-HOST allocation table 103. For example, the information creator 111 determines whether the LUN mapping table 102 for which the updating process has been performed has been associated with the I/F of the server apparatus 2.

If the information creator 111 determines that the target LUN mapping table 102 is not registered in the LUN-HOST allocation table 103 (NO in Operation S11), in Operation S12, the information creator 111 updates the LUN mapping table 102 based on an input by the operator. Then, the process in FIG. 9 is terminated. If the information creator 111 determines that the target LUN mapping table 102 is registered in the LUN-HOST allocation table 103 (YES in Operation S11), in Operation S13, the information creator 111 determines whether the host type of the I/F of the server apparatus 2 to be processed is HP-UX with reference to the host I/F table 101.

If the information creator 111 determines that the host type of the I/F of the server apparatus 2 to be processed is not HP-UX (NO in Operation S13), the process goes to Operation S12. If the information creator 111 determines that the host type of the I/F of the server apparatus 2 to be processed is HP-UX (YES in Operation S13), in Operation S14, the information creator 111 determines whether data corresponding to the LUN mapping table 102 to be processed exists in the new addition LUN table 104. For example, the information creator 111 determines whether the new addition LUN table 104 including the number coinciding with the number of the LUN mapping table 102 to be updated exists.

If the information creator 111 determines that the corresponding data exists in the new addition LUN table 104 (YES in Operation S14), the information creator 111 does not create the new addition LUN table 104. For example, in Operation S15, the information creator 111 displays an error screen indicating that the logical volume 40 for which the notification of the allocation to the server apparatus 2 is not completed exists on the display of the management terminal 3. Then, the process in FIG. 9 is terminated.

If the information creator 111 determines that the corresponding data does not exist in the new addition LUN table 104 (NO in Operation S14), in Operation S16, the information creator 111 determines whether the updating process is the process of adding the logical volume 40 or the process of deleting the logical volume 40. If the information creator 111 determines that the updating process is the process of deleting the logical volume 40 (DELETION in Operation S16), the process goes to Operation S12.

If the information creator 111 determines that the updating process is the process of adding the logical volume 40 (ADDITION in Operation S16), in Operation S17, the information creator 111 updates the LUN mapping table 102 based on an input by the operator. In Operation S18, the information creator 111 creates the new addition LUN table 104 in which the initial state determination flag is added to the server-side LUN added to the LUN mapping table 102.

Figure 10:
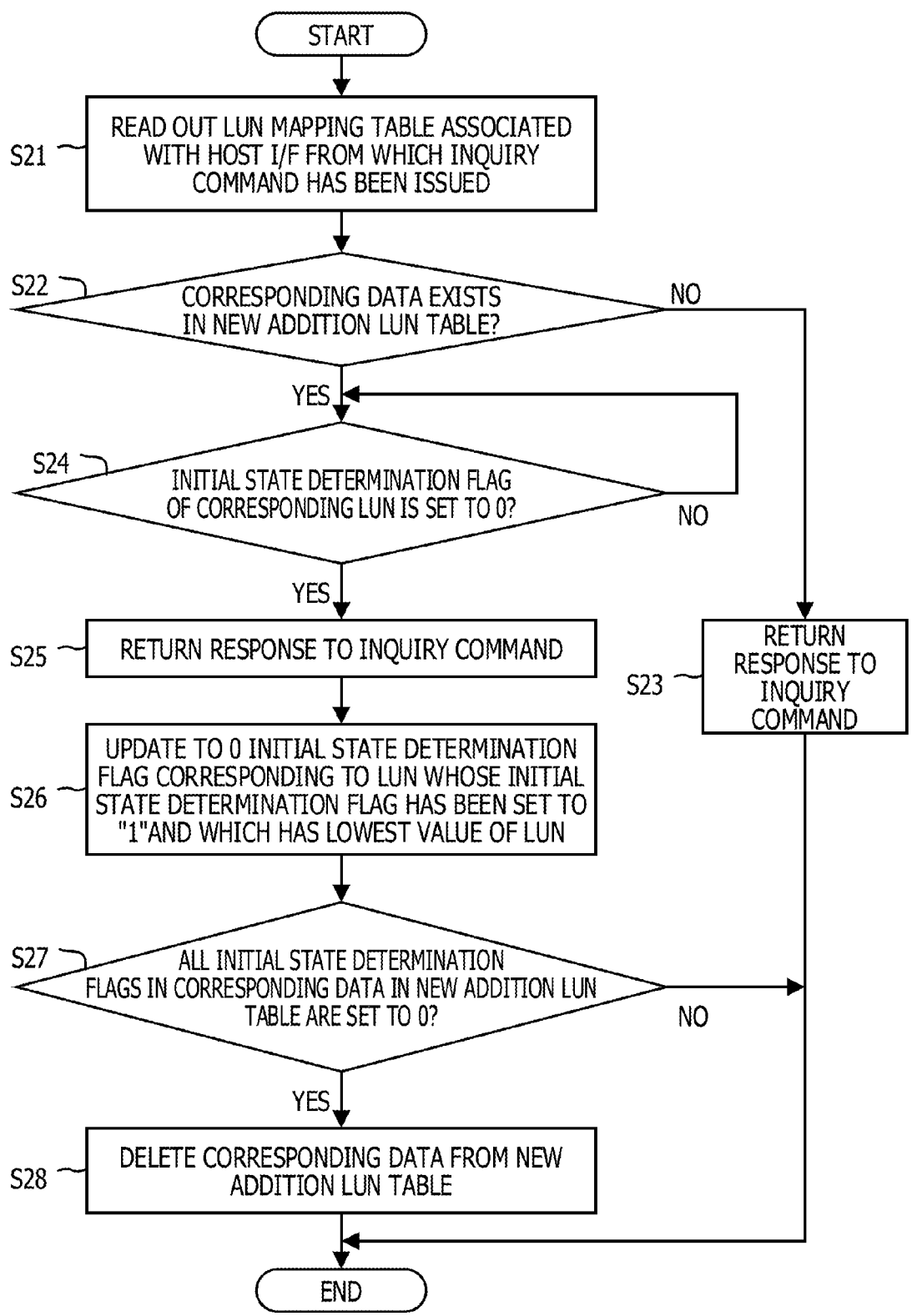
FIG. 10 illustrates an example of a process of responding to an Inquiry command.

In Operation S19, the identification information setter 113 sets the initial state determination flag of the data having the smallest value of the server-side LUN in the new addition LUN table 104 to "0" and sets the initial state determination flags of the pieces of data that do not have the smallest value of the server-side LUN in the new addition LUN table 104 to "1". Then, the process in FIG. 9 is terminated. FIG. 10, FIG. 11, and FIG. 12 illustrate illustrates an example of a process of responding to an Inquiry command.

Operations S21 to S28 in FIG. 10 may be performed for each piece of data in the new addition LUN table 104 illustrated in FIG. 5, for example, for each of the server-side LUNs "0x4000", "0x4001", and "0x4002" in FIG. 5.

FIG. 11 illustrates an example of how the storage apparatus 1 responds to the Inquiry command from the server apparatus 2. FIG. 12 illustrates an example of how the storage apparatus 1 puts the response to the Inquiry command from the server apparatus 2 in the standby mode. The management terminal 3 illustrated in FIG. 1 may be omitted in the storage system 100 illustrated in FIG. 11 and FIG. 12. The functional configuration of the CPU 11 as the command processor 112 is illustrated in the storage apparatus 1 in FIG. 11 and FIG. 12 and the other functional configuration may be omitted or reduced for simplicity.

The server apparatus 2 starts the device recognizing process. For example, the LUN list acquisition process unit 21 in the server apparatus 2 issues a report LUN command 105 to the storage apparatus 1 (refer to symbol C1 in FIG. 11). The LUN list acquisition process unit 21 acquires the LUN mapping table 102 created by the information creator 111 in the storage apparatus 1 from the storage apparatus 1 (refer to symbol C2 in FIG. 11) and holds the acquired LUN mapping table 102 as a LUN list 106.

The device recognition process unit 22 in the server apparatus 2 reads out the LUN list 106 acquired by the LUN list acquisition process unit 21 (refer to symbol C3 in FIG. 11). The device recognition process unit 22 issues an Inquiry command 107, for example, about a logical volume 40a of LUN0 and a logical volume 40b of LUN1 to the storage apparatus 1 based on the LUN list 106 that is read out (refer to symbol C4 in FIG. 11 and symbol D1 in FIG. 12).

The command processor 112 in the storage apparatus 1 receives the Inquiry command from the server apparatus 2. In Operation S21 in FIG. 10, the command processor 112 reads out the LUN mapping table 102 associated with the host I/F from which the Inquiry command has been issued with reference to the LUN-HOST allocation table 103. In Operation S22, the command processor 112 determines whether data corresponding to the LUN mapping table 102 exists in the new addition LUN table 104.

If the command processor 112 determines that the corresponding data does not exist in the new addition LUN table 104 (NO in Operation S22), in Operation S23, the command processor 112 returns the response to the Inquiry command to the server apparatus 2. Then, the process in FIG. 10 is terminated. This means that the server apparatus 2 has issued the Inquiry command about the logical volume 40 that has been recognized.

If the command processor 112 determines that the corresponding data exists in the new addition LUN table 104 (YES in Operation S22), the command processor 112 reads out the data in the corresponding new addition LUN table 104 (refer to symbol C5 in FIG. 11). In Operation S24 in FIG. 10, the command processor 112 determines whether the initial state determination flag of the LUN for which the Inquiry command has been issued is set to "0".

If the command processor 112 determines that the initial state determination flag of the corresponding LUN is not set to "0", for example, is set to "1" (NO in Operation S24), the process goes back to Operation S24 and is in the standby mode until the initial state determination flag is updated to "0". For example, when the initial state determination flag corresponding to the logical volume 40b of LUN1 is set to "1" in the new addition LUN table 104, the response to the Inquiry command about the logical volume 40b of LUN1 is not returned to the server apparatus 2 (refer to symbol D2 in FIG. 12).

If the command processor 112 determines that the initial state determination flag of the corresponding LUN is set to "0" (YES in Operation S24), in Operation S25, the command processor 112 returns the response to the Inquiry command to the server apparatus 2. For example, when the initial state determination flag corresponding to the logical volume 40a of LUN0 is set to "0" in the new addition LUN table 104, the command processor 112 returns the response to the Inquiry command about the logical volume 40a of LUN0 to the server apparatus 2 (refer to symbol C6 in FIG. 11). The device recognition process unit 22 in the server apparatus 2 creates the device file based on the received response to the Inquiry command and registers the device file in the management information in the OS (refer to symbol C7 in FIG. 11).

In Operation S26, the identification information setter 113 in the storage apparatus 1 updates to "0" the initial state determination flag corresponding to the server-side LUN the initial state determination flag of which has been set to "1" in the new addition LUN table 104 and which has the smallest value of the server-side LUN (refer to symbol C8 in FIG. 11). In Operation S27, the information deleter 114 determines whether all the initial state determination flags in the corresponding data in the new addition LUN table 104 are set to "0".

If the information deleter 114 determines that all the initial state determination flags in the corresponding data in the new addition LUN table 104 are not set to "0" (NO in Operation S27), the process in FIG. 10 is terminated. If the information deleter 114 determines that all the initial state determination flags in the corresponding data in the new addition LUN table 104 are set to "0" (YES in Operation S27), in Operation S28, the information deleter 114 deletes the corresponding data from the new addition LUN table 104. Then, the process in FIG. 10 is terminated.

In the CM (storage control apparatus) 10, the information creator 111 creates the new addition LUN table 104 in which the server-side LUN identifying each logical volume 40 to be allocated to the server apparatus 2 is associated with the initial state determination flag indicating whether the notification of the allocation to the server apparatus 2 is available. The identification information setter 113 sets the values of the initial state determination flags of the multiple logical volumes 40 in accordance with the order of recognition of the logical volumes 40 by the server apparatus 2. The command processor 112 notifies the storage control apparatus of the server-side LUN corresponding to the identification information for which the value indicating the notification of the allocation is available is set in the new addition LUN table 104 created by the information creator 111.

Accordingly, the order of recognition of the logical volumes 40 by the server apparatus 2 may be ensured. The identification information setter 113 sets the value indicating that the notification of the allocation is available to the initial state determination flag corresponding to the server-side LUN to be registered at the beginning of the new addition LUN table 104. The identification information setter 113 sets the value indicating that the notification of the allocation is in the standby mode to the initial state determination flags corresponding to the server-side LUNs other than the server-side LUN to be registered at the beginning of the new addition LUN table 104. Upon completion of the notification of the server-side LUNs by the notifier 112, the identification information setter 113 updates the initial state determination flag corresponding to the server-side LUN registered next to the server-side LUN for which the notification is completed in the new addition LUN table 104 to the value indicating that the notification of the allocation is available.

Since the command processor 112 returns the response to the Inquiry command from the server apparatus 2 for each logical volume 40, the server apparatus 2 recognizes the logical volumes 40 and creates the device file in the order supposed by the operator. Accordingly, the re-recognition of the devices or the review of the portions including the device file names, in the settings of the execution commands and software, may not be performed to reduce the burden on the operator.

Upon completion of the notification of all the server-side LUNs included in the new addition LUN table 104 by the notifier 112, the information deleter 114 deletes the new addition LUN table 104. This may suppress the creation of the new addition LUN table 104 in a state in which the logical volumes 40 that have not been recognized by the server apparatus 2 remain in the new addition LUN table 104. Accordingly, the load on the storage system 100 may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus comprising:
   a processor configured to execute a program for controlling access to a logical volume allocatable to a higher-level apparatus; and
   a storage configured to store the program,
   the processor performs operations to:
   set a value of identification information indicating whether notification of allocation to the higher-level apparatus is available in accordance with an order of recognition of a plurality of logical volumes to be allocated to the higher-level apparatus by the higher-level apparatus;
   notify the higher-level apparatus of information concerning one or more logical volumes of the plurality of logical volumes corresponding to the identification information; and
   create additional logical volume information in which logical volume information identifying each of the plurality of logical volumes is associated with the identification information, and stores the additional logical volume information in the storage.

2. The storage control apparatus according to claim 1, wherein the processor sets a first value indicating that the notification of the allocation is available to first identification information corresponding to first logical volume information which is registered at a beginning of the additional logical volume information.

3. The storage control apparatus according to claim 2, wherein the processor sets a second value indicating that the notification of the allocation is put in a standby mode to second identification information corresponding to second logical volume information other than the first logical volume information.

4. The storage control apparatus according to claim 1, wherein the processor sets a second value indicating that the notification of the allocation is put in a standby mode to second identification information corresponding to second logical volume information other than first logical volume information which is registered at a beginning of the additional logical volume information.

5. The storage control apparatus according to claim 1, wherein the processor notifies the higher-level apparatus of allocation of the logical volume information concerning one logical volume of the plurality of logical volumes, and updates the identification information corresponding to subsequent logical volume information registered next to the logical volume information concerning the one logical volume in the additional logical volume information to a first value indicating that the notification of the allocation is available.

6. The storage control apparatus according to claim 1, wherein the processor deletes the additional logical volume information when completing the notification of all logical volume information included in the additional logical volume information.

7. The storage control apparatus according to claim 1, wherein the processor performs the notification of the allocation when receiving an inquiry command from the higher-level apparatus.

8. A storage control system comprising;
a higher-level apparatus; and
a storage control apparatus configured to control access to a logical volume allocatable to the higher-level apparatus,
the storage control apparatus:
sets a value of identification information indicating whether notification of allocation to the higher-level apparatus is available in accordance with an order of recognition of a plurality of logical volumes to be allocated to the higher-level apparatus by the higher-level apparatus:
notifies the higher-level apparatus of information concerning one or more logical volumes of the plurality of logical volumes corresponding to the identification information: and
creates additional logical volume information in which logical volume information identifying each of the plurality of logical volumes is associated with the identification information, and stores the additional logical volume information in the storage.

9. The storage control system according to claim 8, wherein the storage control apparatus sets a first value indicating that the notification of the allocation is available to first identification information corresponding to first logical volume information which is registered at a beginning of the additional logical volume information.

10. The storage control system according to claim 9, wherein the storage control apparatus sets a second value indicating that the notification of the allocation is put in a standby mode to second identification information corresponding to second logical volume information other than the first logical volume information.

11. The storage control system according to claim 8, wherein the storage control apparatus sets a second value indicating that the notification of the allocation is put in a standby mode to second identification information corresponding to second logical volume information other than first logical volume information which is registered at a beginning of the additional logical volume information.

12. The storage control system according to claim 8, wherein the storage control apparatus notifies the higher-level apparatus of allocation of the logical volume information concerning one logical volume of the plurality of logical volumes, and updates the identification information corresponding to subsequent logical volume information registered next to the logical volume information concerning the one logical volume in the additional logical volume information to a first value indicating that the notification of the allocation is available.

13. The storage control system according to claim 8, wherein the storage control apparatus deletes the additional logical volume information when completing the notification of all logical volume information included in the additional logical volume information.

14. The storage control system according to claim 8, wherein the storage control apparatus performs the notification of the allocation when receiving an inquiry command from the higher-level apparatus.

15. A control method comprising:
setting a value of identification information indicating whether notification of allocation to a higher-level apparatus is available in accordance with an order of recognition of a plurality of logical volumes to be allocated to a higher-level apparatus by the higher-level apparatus;
notifying the higher-level apparatus of information concerning one or more logical volumes of the plurality of logical volumes corresponding to the identification information; and
creating additional logical volume information in which logical volume information identifying each of the plurality of logical volumes is associated with the identification information.

16. The control method according to claim 15, further comprising deleting the additional logical volume information when completing the notification of all logical volume information included in the additional logical volume information.

17. The control method according to claim 15, further comprising performing the notification of the allocation when receiving an inquiry command from the higher-level apparatus.

* * * * *